United States Patent

Jäger et al.

Patent Number: 5,510,067
Date of Patent: Apr. 23, 1996

[54] METHOD OF PRODUCING A PLASTIC PIN HAVING AN INSERT IN A NECK PORTION

[76] Inventors: Arnold Jäger, Gehrbergsweg 6, 31303 Burgdorf; Andreas Jäger, Muthesiusweg 45, 30559 Hanover; Sebastian Jäger, Borchersstr. 2, 30559 Hanover, all of Germany

[21] Appl. No.: 459,119

[22] Filed: Jun. 2, 1995

[30] Foreign Application Priority Data

Nov. 30, 1994 [DE] Germany ............... 44 42 601.1

[51] Int. Cl.[6] .................. B29C 44/06; B29C 44/12
[52] U.S. Cl. .............. 264/46.6; 264/46.7; 264/46.9; 264/267; 264/510; 264/516; 473/119
[58] Field of Search .................. 264/46.6, 46.7, 264/46.9, 510, 267, 516; 473/119

[56] References Cited

U.S. PATENT DOCUMENTS

| | | | |
|---|---|---|---|
| 1,603,880 | 10/1926 | Smith | 473/119 |
| 3,025,061 | 3/1962 | Ernst et al. | 473/119 |
| 3,044,777 | 7/1962 | Friedman | 473/119 |
| 3,147,975 | 9/1964 | Gruss et al. | 264/46.7 |
| 3,155,753 | 11/1964 | Weissman et al. | 264/46.7 |
| 3,329,430 | 7/1967 | Wanders | 473/119 |
| 3,424,825 | 1/1969 | Marchand | 264/46.7 |
| 3,478,134 | 11/1969 | Gruss et al. | 264/46.7 |
| 3,619,436 | 11/1971 | Gruss et al. | 264/46.7 |
| 3,971,837 | 7/1976 | Hasegawa et al. | 264/46.7 |
| 4,012,386 | 3/1977 | Davis | 264/250 |
| 4,104,352 | 8/1978 | Morgan et al. | 264/250 |
| 4,123,057 | 10/1978 | Murray | 156/245 |
| 4,210,992 | 7/1980 | Murray | 156/245 |
| 4,457,511 | 7/1984 | Witkowski | 264/45.1 |
| 5,080,842 | 1/1992 | Jager | 264/45.5 |

FOREIGN PATENT DOCUMENTS 1374287 8/1964 France .................. 473/119

Primary Examiner—Allan R. Kuhns
Attorney, Agent, or Firm—Robert W. Becker & Associates

[57] ABSTRACT

A method of producing a plastic pin, including a bowling pin, having a cellular and/or porous core that is surrounded by a solid-walled, noncellular and nonporous shell. The shell is initially produced as a whole body in a mold. While the material of the shell is not yet hardened and is still deformable, an insert is introduced into the narrowed neck portion of the shell, in a direction axial relative thereto, in such a way that the insert displaces an inner layer of the shell, dividing the hollow interior of the shell into an upper and a lower chamber and producing a fixed connection with the material of the shell. Material for the core, with such material being provided with an expanding agent, is then introduced into the shell, and after the shell and the core have set, the mold is removed.

12 Claims, 1 Drawing Sheet

METHOD OF PRODUCING A PLASTIC PIN HAVING AN INSERT IN A NECK PORTION

BACKGROUND OF THE INVENTION

The present invention relates to a method of producing a plastic pin, including a so-called bowling pin, having a cellular and/or porous core that is surrounded by a solid-walled, non-cellular and non porous shell. The shell, which is produced in a mold, is initially a hollow body into which is introduced the material for the core, with this material being provided with expanding agent.

With such plastic pins, it is difficult to embody the pin in such a way that it exhibits the prescribed operating characteristics, and in particular a special tipping characteristic that is a function of a precise positioning of the level of the center of gravity. Also of importance is the rotational characteristic of the pin relative to the main axis (the axis of rotation).

In view of the foregoing, it is an object of the present invention to improve a plastic pin of the aforementioned general type such that the officially required operating characteristic of the pin, especially with respect to the location of the center of gravity, is ensured, and in particular in such a way that with a particular configuration of the shell of the plastic pin, it is even possible to alter the position of the level of the center of gravity by varying the process.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The method of the present invention is characterized primarily in that prior to the introduction into the shell of the material for the core, and with the material for the core not yet hardened and still deformable, an insert is introduced into a narrowed neck portion of the shell in the axial direction of the pin in such a way that the insert displaces an inner layer of the shell and in the desired position produces a fixed connection with the material of the shell; the materials for the shell and for the insert are preferably coordinated with one another in such a way that at appropriate process temperatures a fusion can occur. Furthermore, the insert is also introduced in such a way that it assumes a concentric position relative to the pin.

The inventive method of producing a pin has the great advantage that the hollow interior of the pin that is later to be filled with the material for the core can be partitioned into a larger lower chamber and a smaller upper chamber so that it is also possible to merely fill the lower chamber with the core material, i.e. to keep that part of the hollow interior that is disposed above the neck portion free of core material. In this connection, it is also possible to vary how far the insert is introduced, thus providing a further influence for the position of the level of the center of gravity of the pin. It is also important that when the insert is introduced, the insert displaces a portion of the shell material, i.e. pushes a certain quantity thereof ahead, wherein the insert, in a concentric position, produces its own bed over a considerable length thereof, while at the same time ensuring that a uniform thickness of the wall of the shell is achieved in the neck portion.

The insert preferably contains a longitudinal bore that makes it possible to vent the space below the insert when this space is filled with the core material. In order to additionally improve the deforming and displacing effect of the insert when it is inserted, the insert has a slightly conical configuration, whereby such a configuration can also involve small steps such that the smallest diameter of the insert is disposed at the free end thereof. Finally, the insert also preferably has a longitudinal bore with bore portions of differing diameter, thus resulting in steps, with the smallest diameter of the longitudinal bore being disposed at the front end of the insert. Such a bore makes it possible to provide for a favorable connection of a tool during insertion of the insert. Such a bore is also advantageous during the introduction of the core material. In particular, the bore ensures that the material cannot pass through the entire longitudinal bore, but rather only a portion thereof, thereby keeping that chamber that is disposed above the insert free of core material.

Further specific features of the present invention will be described in detail subsequently.

DESCRIPTION OF PREFERRED EMBODIMENTS

Figure 1:
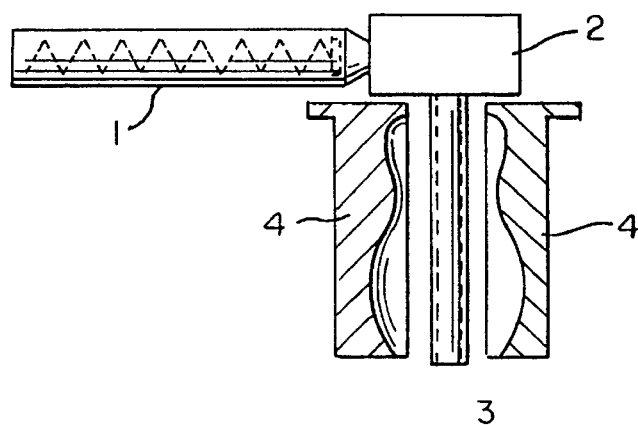
FIG. 1 shows a partially cross-sectioned apparatus for producing a plastic pin in accordance with the present invention.

Referring now to the drawings in detail, the apparatus illustrated in FIG. 1 serves as a manufacturing apparatus for blow molding and includes an extruder 1, a pressure head 2 that is supplied therefrom and from which extends a hose 3 that is made of thermoplastic material, especially a plastic having a polyamide base. Associated with the hose 3 is a mold having two halves 4. The mold determines the outer contour of the pin and forms the shell 5 of the pin that is to be produced from the hose 3 via blow devices. Disposed below a head 6 and above a barrel portion 7 the pin has a reduced diameter neck 8. In the vicinity of this neck 8, the wall of the shell 5 is thicker than in the barrel portion 7 and the head 6. The neck 8 has an inside diameter "d" at its narrowest location.

Also serving for the manufacture of the pin is an insert 9 that is embodied as a body of rotation; the insert 9 is made of the same material as the shell 5. The insert 9 has a slightly conical outer surface 10 that tapers toward the free, front end 11; however, the outer surface 10 is not smoothly conical but rather has a stepped configuration. The insert 9 furthermore has a central longitudinal bore 12 that is also stepped, having its greater diameter at the rear end. At the front end 11, the outer surface 10 has a diameter that essentially corresponds to the diameter "d".

After the shell 5 has been formed (until final completion the base is not closed off), the insert 9 is driven into the narrowed portion of the neck 8 by a push member 13 that can be moved back and forth in a direction that is axial relative to the mold halves 4. In particular, this takes place with a not yet hardened and still deformable shell 5. The front end of the push member 5 has a shape that corresponds to the longitudinal bore 12 to ensure a reliable guidance and support of the insert 9.

It is to be understood that as a consequence of the aforementioned diameter relationships, the insert 9 contacts the small diameter inner layers at 14 and displaces them in a direction toward the head 6, thereby forming a bead at 15 when the insert 9 has reached the desired position within the hollow interior of the shell 5. This produces a relatively large contact surface between the neck portion and the insert 9. A fusion of the components results from the existing temperature conditions. The materials of the insert 9 and of the shell 5 therefore blend with one another. This takes place at a temperature of about 180°–220° C. A bulging out or expansion of the neck 8 cannot occur since the shell 5 is still confined in the mold 4.

It should be noted that the desired height or position of the insert 9 can be established by a simple control of the push member 13 in order in this way to influence the operating characteristics of the pin.

After the insert 9 has been fixed in position, the expandable material for the core of the pin is introduced in a conventional manner from below via the base of the shell 5. In particular, this takes place at a temperature of about 220°–250° C. in order in this manner to also bring about an intimate connection (fusion) between the material and the shell 5.

Figure 3:
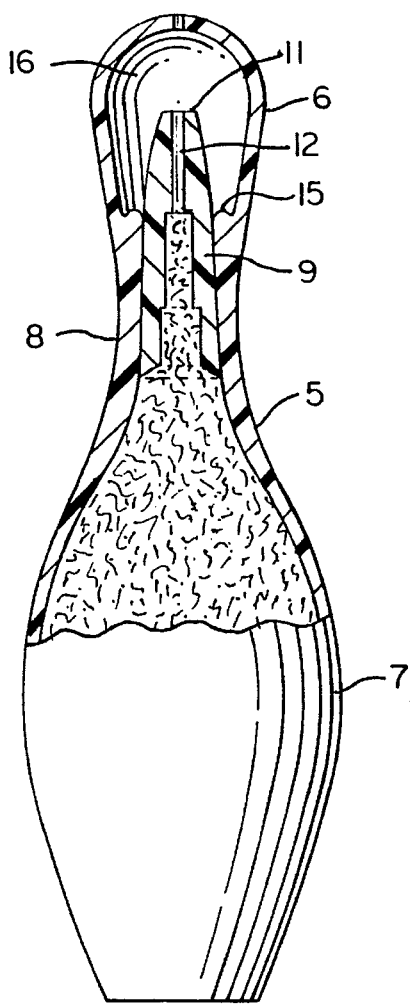
FIG. 3 is a partially cross-sectioned view showing the finished pin.
Figure 2:
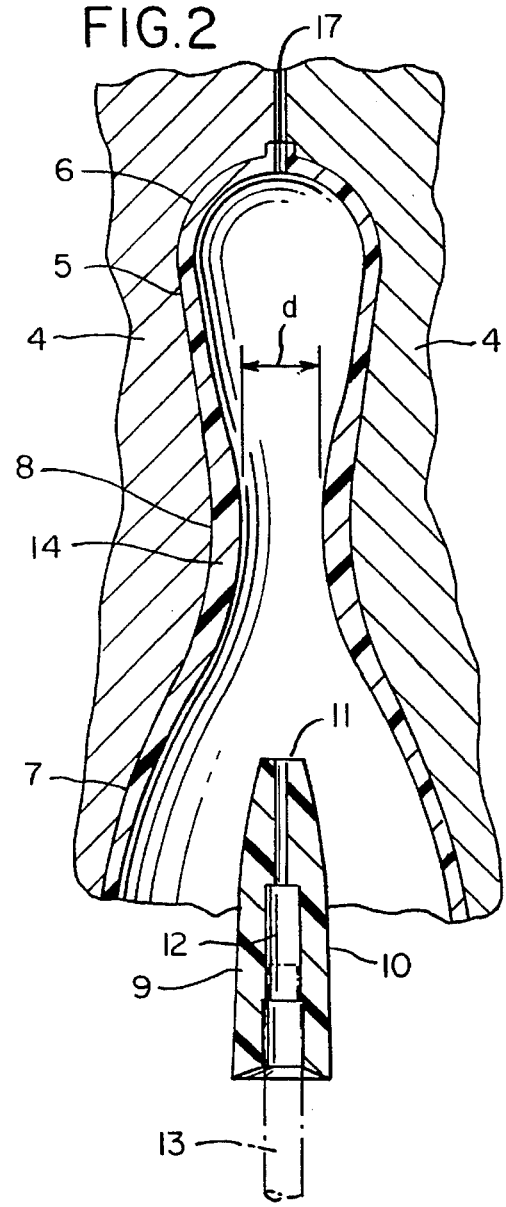
FIG. 2 is a cross-sectional view of the upper portion of the manufacturing mold for a plastic pin.

Due to the presence of the insert 9, the core material cannot spread beyond the insert. Although the core material enters the longitudinal bore 12, it cannot pass therethrough since it becomes solidified or losses its ability to spread in the narrower portion of the longitudinal bore 12. The final state is recognizable in FIG. 3.

It can also be seen that above the insert 9 in the shell 5 a chamber 16 is formed that is merely filled with air; however, during the manufacturing process the chamber 16 can be vented via a hole 17. When the pin is completed, this hole is closed off by a subsequent treatment. It is also to be understood that during the foaming process or penetration of the core material into the shell 5 the longitudinal bore 12 serves for venting.

The material for the core is preferably polypropylene and can contain glass fibers having a proportion of about 20–40%.

The present invention is, of course, in no way restricted to the specific disclosure of the specification and drawing, but also encompasses any modifications within the scope of the appended claims.

What we claim is:

1. A method of producing a plastic pin, optionally a bowling pin, having a cellular and/or porous core that is surrounded by a solid-walled, noncellular and nonporous shell, said method including the steps of:

providing a mold;

producing said shell in said mold as an initially hollow body;

while the material of said shell is not yet hardened and is still deformable, inserting into a narrowed neck portion of said shell, in a direction axial relative thereto, an insert in such a way that said insert displaces an inner layer of said shell, divides a hollow interior of said shell into an upper and a lower chamber, and produces a fixed connection with said material of said shell;

thereafter introducing into said shell material for said core thereof, wherein said core material is provided with an expanding agent; and after setting of said shell and said core, removing said mold.

2. A method according to claim 1, wherein said shell and said insert are fused together.

3. A method according to claim 1, wherein said step of inserting said insert comprises inserting said insert from an underside or support surface of said shell.

4. A method according to claim 1, which includes the step of providing said insert with an effective outer diameter such that in a displaced state of said material of said shell, a majority of a length of said insert is in contact with said shell.

5. A method according to claim 1, which includes the step of providing said insert with a diameter that becomes smaller toward a free end of said insert.

6. A method according to claim 5, wherein said insert is embodied as a body of rotation.

7. A method according to claim 5, which includes the step of providing said insert with a stepped outer diameter.

8. A method according to claim 1, which includes the step of providing said insert with a longitudinal bore.

9. A method according to claim 8, wherein said longitudinal bore has a diameter that increases in a direction toward a rear end of said insert.

10. A method according to claim 9, wherein said diameter of said longitudinal bore varies in steps.

11. A method according to claim 1, which includes the further steps of:

providing a push member for supporting and guiding said insert, wherein said push member is disposed axially relative to said mold and is movable back and forth in such an axial direction;

connecting said push member in an interlocking manner with said insert;

carrying out said step of inserting said insert into said narrowed neck region of said shell to achieve a prescribed positioning of said insert; and detaching said push member from said insert by withdrawing said push member from said insert.

12. A method according to claim 1, wherein said step of producing said shell in said mold comprises molding said shell via a blow process such that said neck region of said shell has a wall thickness that is greater than wall thicknesses of remaining portions of said shell.

* * * * *